Jan. 26, 1971 C. F. KURTH 3,559,105

TWO-PART GYRATOR AS THE FEEDBACK NETWORK OF
A VOLTAGE-CONTROLLED OSCILLATOR
Filed Sept. 23, 1968

INVENTOR
C. F. KURTH
BY Peter L. Berger
ATTORNEY

United States Patent Office 3,559,105

Patented Jan. 26, 1971

3,559,105

TWO-PART GYRATOR AS THE FEEDBACK NETWORK OF A VOLTAGE-CONTROLLED OSCILLATOR

Carl F. Kurth, Andover, Mass., assignor to Bell Telephone Laboratories, Incorporated, Murray Hill and Berkeley Heights, N.J., a corporation of New York Filed Sept. 23, 1968, Ser. No. 761,569
Int. Cl. H03c *3/22*
U.S. Cl. 332—30 3 Claims

ABSTRACT OF THE DISCLOSURE

A voltage-controlled oscillator is provided which includes a gyrator circuit connected in the series feedback path of the oscillator. The gyrator, when capacitively terminated, functionally resembles an inductance and is connected as a two-port network in the feedback path.

BACKGROUND OF THE INVENTION

This invention relates generally to voltage-controlled oscillators and, more particularly, to inductorless voltage-controlled oscillators.

A voltage-controlled oscillator commonly includes a tank resonant circuit in its feedback path. The tank resonant circuit usually comprises inductor and capacitor elements which, in part, determine the frequency of the output of the oscillator. By varying the value of the capacitor or inductor elements of the resonant circuit in response to an external signal, the frequency of the output of the oscillator will vary.

The value of the capacitor element is commonly varied by utilizing a varactor diode. By varying the back-bias voltage across the diode, its capacitance will vary. Since its total capacity and variation range are relatively small, voltage-controlled oscillators employing variable capacitors are restricted primarily to high frequency applications. Inductance variation may be obtained by making the value of the inductance responsive to a variation in the current passing through it. This variation also is very small and, at low frequencies, such as below 50 kilohertz, only small variation ratios can be achieved.

Prior art voltage-controlled oscillators commonly include the above-mentioned inductor element. There are many advantages to be realized from the elimination of inductors from network realizations. In practical circuit applications, inductors may create problems because of their associated magnetic fields and also because of their nonlinear behavior. In synthesis procedures, inductors complicate network design because of their winding resistance and coil loss. In many applications, the size and weight of inductors make them undesirable. Finally, it is virtually impossible to realize practical inductors in integrated circuits. The concept of eliminating inductors from voltage-controlled oscillators without relinquishing any of the properties that such inductors provide is most desirable.

A gyrator is used to simulate inductance and replace the coil in the voltage-controlled oscillator. This gyrator is a two-port nonreciprocal device with the property that the input impedance seen at either port is the reciprocal of any impedance connected to the other port. Thus, a capacitive termination at the output port produces two-terminal behavior identical to that of an inductor at the input port. Unfortunately, a straightforward replacement of a coil (inductor) by a capacitively terminated gyrator requires nearly ideal or perfect gyrators; otherwise the gyrator-realized coil is lossy and the Q of the resonant circuit becomes low and varies with the variation of the gyration ratio. In a voltage-controlled oscillator these characteristics cannot be tolerated. Therefore, direct substitution of a capacitively terminated gyrator for the coil in a resonant feedback circuit of a voltage-controlled oscillator cannot be accomplished without significant disadvantages.

An object of the present invention is to provide a voltage-controlled oscillator which may be fabricated by integrated circuitry techniques.

Another object of the present invention is to provide a practical voltage-controlled oscillator which can be realized with nonideal and nonperfect gyrators.

Another object of the present invention is to provide a voltage-controlled oscillator utilizing a gyrator.

Another object of the present invention is to provide a voltage-controlled oscillator which can be utilized over a wide range of frequency variations.

Another object of the present invention is to provide a voltage-controlled oscillator whose output frequency is linearly related to a variable element in the feedback path over a wide range of frequency outputs.

SUMMARY OF THE INVENTION

These objects are accomplished in accordance with the present invention by connecting a gyrator as a two-port network in series in the feedback path of a voltage-controlled oscillator. The gyrator is capacitively terminated and, when directly connected in the feedback path as a two-port network the losses of the gyrator may be compensated completely and be independent of the output frequency of the voltage-controlled oscillator by merely increasing the feedback loop gain.

In accordance with the principles of the present invention, this circuit configuration permits the frequency output produced to be linearly dependent on the gyration ratio while the magnitude of the output voltage is independent of the gyration ratio. By utilizing the gyrator as a two-port network in the feedback path, the disadvantages arising from the direct substitution, as above suggested, are eliminated, and, for instance, integrated circuitry techniques may be utilized to fabricate the desired voltage-controlled oscillator. Further, if the gyrator has significant gain, the amplifier required in an oscillator circuit is not required.

DETAILED DESCRIPTION

Figure 1:
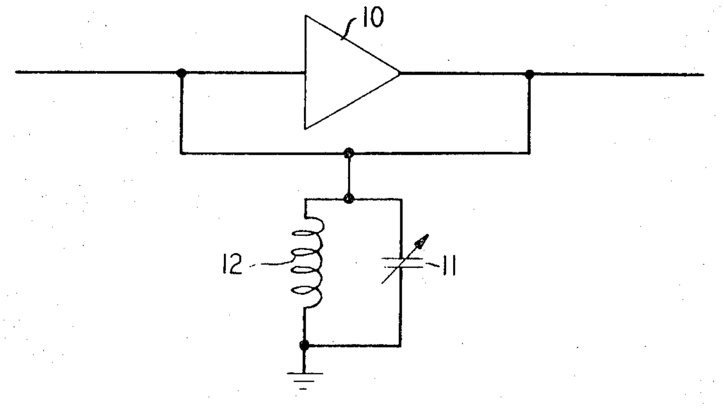
FIG. 1 PRIOR ART
FIG. 1 is a schematic diagram of one type of prior art voltage-controlled oscillator utilizing a resonant tank circuit comprising an inductor and a variable capacitor in its feedback path.

One type of prior art voltage-controlled oscillator commonly includes a parallel resonant circuit in its feedback path with at least a variable capacitor and inductor elements. FIG. 1 presents a schematic diagram of such a voltage-controlled oscillator. The output of amplifier 10 is connected to one side of a tank circuit comprising variable capacitor 11 and inductor 12. Variable capacitor 11 and inductor 12 are each joined at one end to ground, and at the other end to the input and output terminals of amplifier 10. It is well known that by varying the capacitance of variable capacitor 11, the tank circuit resonant frequency varies, thus producing a variation in the frequency output of the voltage-controlled oscillator shown in FIG. 1.

The capacitance variation of variable capacitor 11 is achieved, for example, by applying a small back-bias voltage across a varactor diode which causes its capacitance to vary, thus varying the resonant frequency of the tank circuit. As above discussed, utilizing a varactor diode or other prior art variable capacitance devices severely limits the range of frequency of the output signal produced by a voltage-controlled oscillator such as shown in FIG. 1. In addition, the voltage-controlled oscillator of FIG. 1 has other disadvantages arising out of the use of a coil in the resonant circuit.

The variation in the frequency of the output of the voltage-controlled oscillator of FIG. 1 may also be achieved by varying the inductance of coil 12 in response to the current flowing through it. Again, because the amount of possible variation is slight, the output frequency variation of the voltage-controlled oscillator shown in FIG. 1 is severely limited.

Figure 2:
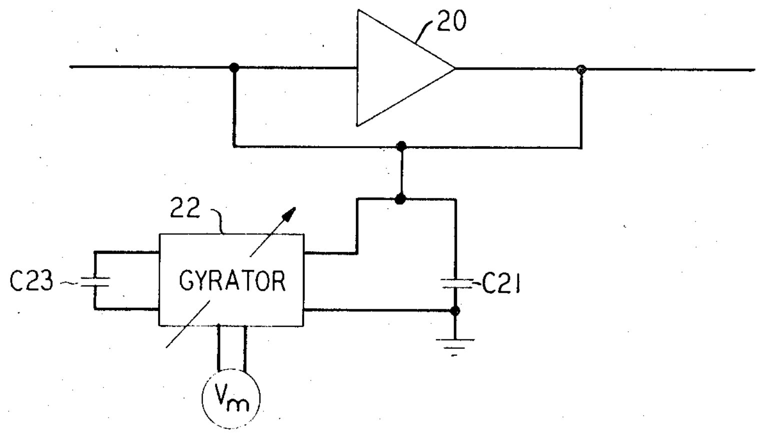
FIG. 2 is a schematic diagram of a voltage-controlled oscillator with a capacitively terminated gyrator directly substituted for the inductor in the resonant circuit of FIG. 1.

FIG. 2 is a schematic diagram of a voltage-controlled oscillator including a capacitively terminated gyrator circuit which is substituted for inductor 12 of FIG. 1. Amplifier 20 has its output connected to a one side of a parallel resonant circuit comprising capacitor C21 and variable gyrator 22 (the variable quality of which is indicated by an arrow) terminated by capacitor 23. The gyrator is terminated by a capacitor C23 connected to the output terminals of gyrator 22. The other side of the parallel resonant circuit is connected to ground. The input and output terminals of amplifier 20 are connected together to form a feedback path that includes the parallel resonant circuit. The voltage dependent variable element in the tank circuit may be either capacitor C21 or C23 or gyrator 22. Modulating voltage $v_m$ is shown as connected to gyrator 22 in order to provide voltage-controlled oscillator action. The variation in the value of capacitors C21 or C23 responsive to an applied voltage has been discussed above with relation to a varactor diode, in which the capacitance of the diode varies as the back-bias voltage varies. Certain characteristics of gyrator 22 may also be responsive to an externally applied voltage.

A gyrator is a two-port device which may be characterized by the following matrix equation:

$$\begin{pmatrix} V_1 \\ I_1 \end{pmatrix} = \begin{pmatrix} \epsilon_1 & \frac{1}{g_1} \\ g_2 & \epsilon_2 \end{pmatrix} \begin{pmatrix} V_2 \\ I_2 \end{pmatrix} \quad (1)$$

The quantities $\epsilon_1$ and $\epsilon_2$ on the main diagonal represent losses which are zero in the case of an ideal gyrator. The distinct gyration ratios, $g_1$ and $g_2$, are used to indicate that the forward and backward voltage current conversions may not be identical. For a thorough mathematical presentation see pages 26 through 34 of Active Network Synthesis, by Kendall L. Su, published by McGraw-Hill Book Company, 1965. The gyration ratio is defined as $$G=\sqrt{g_1g_2}$$

A technique to control the gyrator ratio by an external voltage is explained in an article entitled "An Integratable Time-Variable Gyrator," by W. New and R. Newcomb in the Proceedings of the IEEE, December 1965.

Direct substitution of the capacitively terminated gyrator to replace inductor 12 in the resonant circuit of FIG. 1 produces the circuit shown in FIG. 2. That the performance of the voltage-controlled oscillator of FIG. 2 is unsatisfactory, may be seen from the following analysis: The resonant frequency of the voltage-controlled oscillator of FIG. 1 may be shown to be:

$$\omega_0=\frac{1}{\sqrt{LC}} \quad (2)$$

The gyration ratio of the gyrator of FIG. 2 affects both the amplitude and the frequency of oscillation. Due to the losses of currently available gyrators, adjustment of the gyration ratio does not produce linear frequency control. In order to provide satisfactory oscillator performance, the amplifier of FIG. 2 must have high gain and a built-in limiter to provide a nonlinear gain characteristic. Furthermore, voltage fluctuations of the power supply affect the frequency of oscillation even though the amplifier satisfies the foregoing conditions and the circuit does not exhibit desirable performance characteristics. This is extremely undesirable since the output of the voltage-controlled oscillator would be amplitude modulated and amplitude modulation in an FM signal requires the use of additional expensive detection apparatus in order to derive the modulating information. It would be preferable to provide a voltage-controlled oscillator which produces an output whose amplitude is independent of the frequency of its output.

It may be mathematically shown that the dependency problem attendant the voltage-controlled oscillator of FIG. 2 is caused by the nonideal and nonperfect nature of the present-day gyrators that could be used and, in particular, their losses. Therefore, the voltage-controlled oscillator shown in FIG. 2 with the direct substitution for the inductor of FIG. 1 by the capacitively terminated gyrator 22 is undesirable for use as a voltage-controlled oscillator.

Figure 3:
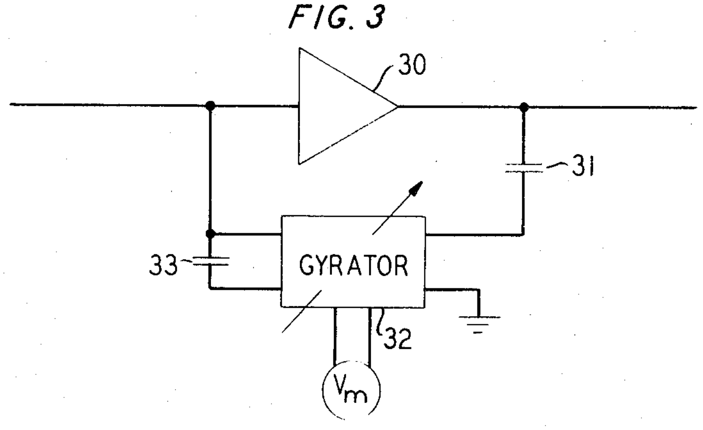
FIG. 3 is a schematic diagram of a voltage-controlled oscillator which, in accordance with the present invention, has a capacitively terminated gyrator connected as a two-port network in series in the feedback path of the oscillator.

A voltage-controlled oscillator containing a nonideal and nonperfect gyrator having losses is connected as a two-port network in the feedback path and shown in FIG. 3. Amplifier 30 has its output connected to one side of capacitor 31, the other side of which is connected to one input terminal of two-input terminal variable gyrator 32. The arrow in the figure indicates that the variation ratio of gyrator 32 is capable of being varied. The other input terminal of gyrator 32 is connected to ground. Gyrator 32 is terminated by capacitor 33 to simulate inductive performance by connecting capacitor 33 across the two output terminals of gyrator 32. One terminal of the two output terminals of gyrator 32 is connected to the input of amplifier 30.

By connecting gyrator 32 directly in the feedback path from the output to the input of amplifier 30, the losses of the gyrator may be compensated by increasing the gain of amplifier 30, and the problems attendant the direct substitution of the capacitively terminated gyrator circuit in FIG. 2 may be obviated. In particular, it may be shown that the output amplitude of the voltage-controlled oscillator shown in FIG. 3 is independent of the frequency of its output even when the frequency is determined by a variation in the gyration ratio of gyrator 32. In order to provide voltage-controlled oscillator performance, a modulating voltage $v_m$ is connected to gyrator 32 in order to vary its gyration ratio. Circuit analysis of FIG. 3 shows that the frequency of oscillation can be expressed as:

$$\epsilon_0=\frac{G}{\sqrt{C_{33}C_{31}}} \quad (3)$$

The independence of the magnitude of the output from the gyration ratio variation is extremely important since it permits a voltage-controlled oscillator to be provided which includes a gyrator in its feedback path. Since the capacitively terminated gyrator may simulate inductor performance, the voltage-controlled oscillator shown in FIG. 3 may be constructed without inductors and may, for example, be fabricated by integrated circuitry techniques.

Circuit analysis of the voltage-controlled oscillator shown in FIG. 3 indicates that a linear relationship may be established between the modulating signal $v_m$ which is used to control the frequency output of the voltage-controlled oscillator and the variable elements in the gyrator. The variable elements may be resistors which are capable of great variation, and thus, the voltage-controlled oscillator may operate over a wider frequency output range than that obtainable with prior art devices. In the alternative, the elements in the gyrator may be maintained constant and capacitor 31 or 33 varied in order to vary the frequency of the output of the voltage-controlled oscillator.

The voltage-controlled oscilator shown in FIG. 3 provides significant benefits over the prior art. These benefits include the ability to fabricate the voltage-controlled oscillator by integrated circuitry techniques and the maintenance of a constant amplitude output from the voltage-controlled oscillator while the frequency of the output is varied. Further, a much wider range of output frequency variations in the voltage-controlled oscilator is obtainable due to the significant variation capability in the frequency determining elements of gyrator 32. It is also possible to eliminate amplifier 30 by providing a gyrator which has a significant gain and may utilize its gain in the feedback path to provide sufficient amplification for oscillatory action.

It is to be understood that the embodiments of the invention which have been described are illustrative of the application of the principles of the invention. Numerous modifications may readily be devised by those skilled in the art without departing from the spirit and scope of the invention.

What is claimed is:

1. A radio frequency oscillator comprising:

an amplifier having an input port and an output port, feedback means comprising a series two-port transmission network comprising a gyrator having an input port and an output port, first means for connecting the output port of said amplifier to the input port of said gyrator, second means for connecting the output port of said gyrator to the input port of said amplifier, and said first and second means comprising energy storing devices, whereby said amplifier and gyrator form a closed frequency-selective feedback loop having the appropriate gain and phase to compensate for the losses of said gyrator to sustain radio frequency oscillations at a frequency determined by said feedback network.

2. The radio frequency oscillator of claim 1 wherein means for linearly controlling the frequency comprises said gyrator having a variable gyration ratio controlled by an external voltage source.

3. The radio frequency oscillator of claim 1 wherein said energy storing devices comprise a first and second capacitor.

References Cited

UNITED STATES PATENTS

| | | | |
|---|---|---|---|
| 3,332,035 | 7/1967 | Kovalevski | 331—36(C)X |
| 3,400,335 | 9/1968 | Orchard et al. | 333—80(UX) |
| 3,370,254 | 2/1968 | Keller | 331—36(C)X |
| 3,401,352 | 9/1968 | Mitra | 333—80X |
| 3,479,615 | 11/1969 | Garver | 332—16X |

ALFRED L. BRODY, Primary Examiner

U.S. Cl. X.R.

307—320; 331—36, 177; 333—1.1, 24, 80